US012608456B2

(12) United States Patent  
McGuinness et al.

(10) Patent No.: US 12,608,456 B2  
(45) Date of Patent: Apr. 21, 2026

(54) IDENTIFICATION SYSTEM, GEOGRAPHIC LOCATION VERIFICATION SYSTEM, COMMUNICATION SYSTEM, PROCESS FOR AUTHENTICATING, AND METHODS OF USE

(71) Applicant: Bloodhound Intelligence, Inc., Westport, CT (US)

(72) Inventors: Luke McGuinness, Westport, CT (US); Brian McGuinness, Lanesborough, MA (US)

( * ) Notice: Subject to any disclaimer, the term of this patent is extended or adjusted under 35 U.S.C. 154(b) by 154 days.

(21) Appl. No.: 18/444,638

(22) Filed: Feb. 17, 2024

(65) Prior Publication Data

US 2024/0281510 A1     Aug. 22, 2024

Related U.S. Application Data

(60) Provisional application No. 63/446,813, filed on Feb. 18, 2023.

(51) Int. Cl.
| | |
|---|---|
| *G06F 21/32* | (2013.01) |
| *H04W 12/06* | (2021.01) |
| *H04W 12/104* | (2021.01) |

(52) U.S. Cl.  
CPC ............ *G06F 21/32* (2013.01); *H04W 12/06* (2013.01); *H04W 12/104* (2021.01)

(58) Field of Classification Search  
CPC ...... G06F 21/32; H04W 12/06; H04W 12/104  
See application file for complete search history.

(56) References Cited

U.S. PATENT DOCUMENTS

| | | | | |
|---|---|---|---|---|
| 6,183,140 | B1 * | 2/2001 | Singer .................. | G06Q 40/123 |
| | | | | 705/31 |
| 7,225,249 | B1 * | 5/2007 | Barry ..................... | H04L 41/28 |
| | | | | 709/227 |
| 8,508,338 | B1 * | 8/2013 | Fiddy .............. | G06Q 20/40145 |
| | | | | 340/5.82 |
| 2008/0095409 | A1 * | 4/2008 | McQuaide ......... | G08B 21/0261 |
| | | | | 382/115 |

(Continued)

FOREIGN PATENT DOCUMENTS

WO      WO-2008134702 A2 *  11/2008   ....... G06Q 10/06375

OTHER PUBLICATIONS

Witte et al., "Context-Aware Mobile Biometric Authentication based on Support Vector Machines", Sep. 2013, Fourth International Conference on Emerging Security Technologies, pp. 29-32 (Year: 2013).*

*Primary Examiner* — Kenneth W Chang

(57) ABSTRACT

An identification system, a geographic location verification system, a system for verifying an identification in a geographic location, processes of authenticating, and methods of use are presented. The present disclosure utilizes global positioning systems in concert with various biometric information to authenticate the presence of a person in a particular place, at a particular time. More specifically, and without limitation, the present system authenticates location of a person in a given place at a given time for validation, authentication, and verification to be used by others and/or provided to others for use in verifying percentages of time spent in a plurality of locations. This may be a particular date, particular time period, or percentage in a particular place.

19 Claims, 19 Drawing Sheets

(56)　　　　　　　References Cited

U.S. PATENT DOCUMENTS

| | | | |
|---|---|---|---|
| 2008/0167809 A1* | 7/2008 | Geelen | G01C 21/3655 |
| | | | 707/E17.121 |
| 2009/0024661 A1* | 1/2009 | Kelliher | G06F 16/58 |
| 2011/0111726 A1* | 5/2011 | Kholaif | H04W 76/50 |
| | | | 455/456.2 |
| 2012/0084248 A1* | 4/2012 | Gavrilescu | G06F 16/9535 |
| | | | 706/54 |
| 2013/0279768 A1* | 10/2013 | Boshra | G06F 21/32 |
| | | | 382/124 |
| 2013/0325396 A1* | 12/2013 | Yuen | G01C 22/006 |
| | | | 702/160 |
| 2014/0125502 A1* | 5/2014 | Wittkop | G08G 1/127 |
| | | | 340/6.1 |
| 2015/0007297 A1* | 1/2015 | Grossemy | G06F 21/32 |
| | | | 726/7 |
| 2015/0186958 A1* | 7/2015 | Jackson | H04W 4/029 |
| | | | 705/347 |
| 2016/0224982 A1* | 8/2016 | Vergari | G06Q 20/409 |
| 2017/0195339 A1* | 7/2017 | Brown | H04L 63/0861 |
| 2019/0357049 A1* | 11/2019 | Tali | H04W 12/64 |
| 2021/0256536 A1* | 8/2021 | Abdelsamie | G06Q 30/018 |
| 2021/0274265 A1* | 9/2021 | Brody | H04N 21/4524 |

* cited by examiner

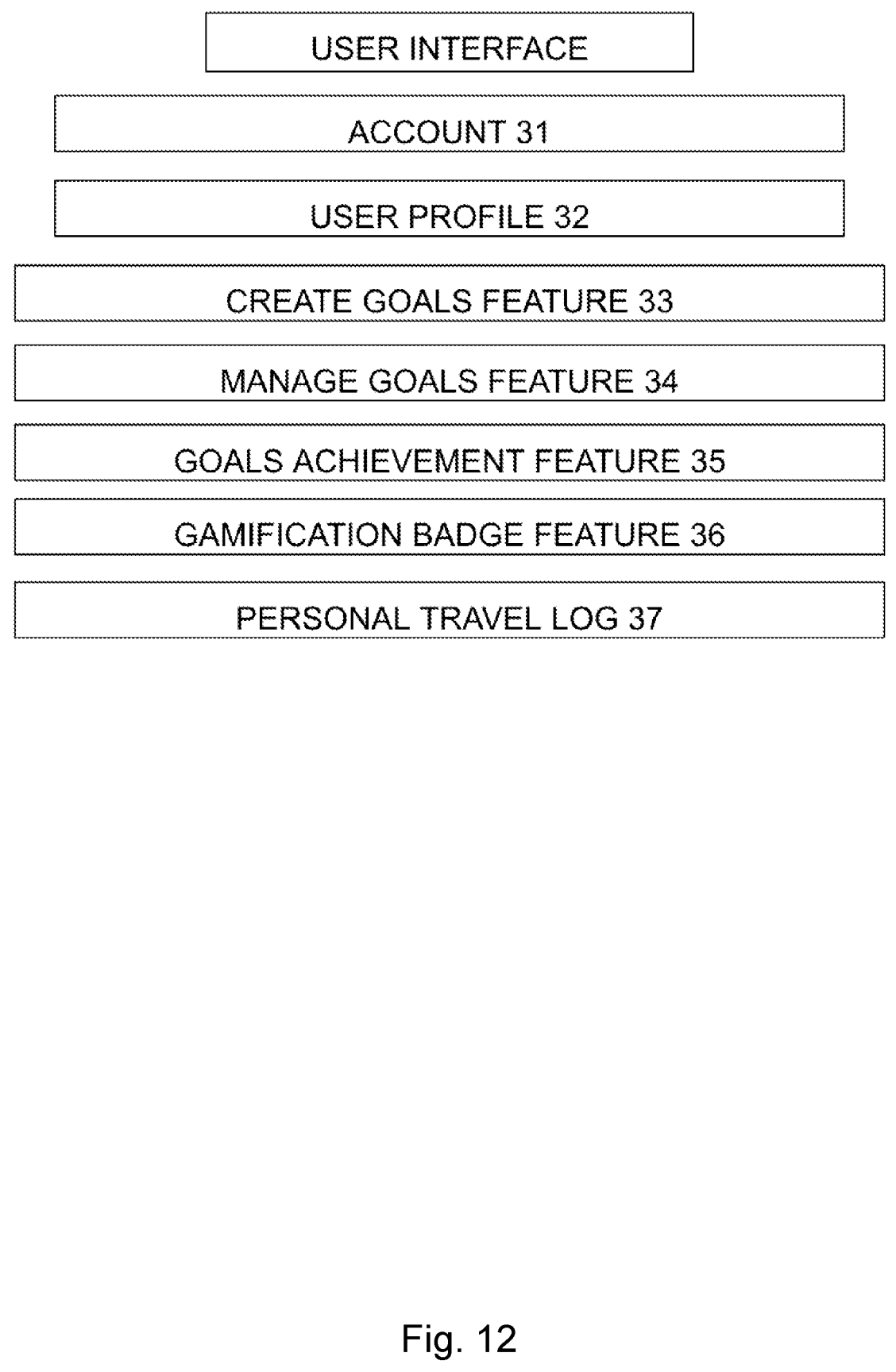

USER INTERFACE

ACCOUNT 31

USER PROFILE 32

CREATE GOALS FEATURE 33

MANAGE GOALS FEATURE 34

GOALS ACHIEVEMENT FEATURE 35

GAMIFICATION BADGE FEATURE 36

PERSONAL TRAVEL LOG 37

Fig. 12

IDENTIFICATION SYSTEM, GEOGRAPHIC LOCATION VERIFICATION SYSTEM, COMMUNICATION SYSTEM, PROCESS FOR AUTHENTICATING, AND METHODS OF USE

CROSS-REFERENCES

The present application claims priority to the U.S. Provisional Patent Application No. 63/446,813 which was filed on Feb. 18, 2023, which is hereby incorporated by reference herein in its entirety, including any figures, tables, or drawings.

BACKGROUND OF THE INVENTION

This disclosure relates to an identification system, a geographic location verification system, a system for verifying an identification in a geographic location, processes of authenticating, and methods of use. More specifically, and without limitation, the present disclosure relates to a system for accurately tracking the quantity of time an authenticated user spends in a physical location. More specifically, and without limitation, the present disclosure relates to a system for accurately tracking the quantity of time a user spends in a physical location.

DESCRIPTION

At least a portion of the disclosure of this patent document contains material that is subject to copyright protection. The copyright owner has no objection to the facsimile reproduction by anyone of the patent document or the patent disclosure, as it appears in the Patent and Trademark Office patent files and/or records, but otherwise reserves all copyright rights whatsoever. The following notice applies to the software and data as described below and in the drawings that form a part of this document. Copyright Bloodhound Intelligence, Inc. All rights reserved.

BACKGROUND OF THE INVENTION

Smart devices or smart phones are well known in the art. Smart phones, also referred to commonly as mobile phones, generally include an operating system stored on an onboard computing system which includes a storage means or memory, processor, and the like. This operating system utilizes computing power for various mobile features found on cell phones and/or mobile phones today. One feature, included in smart phones, is global positioning.

Global positioning, and similar location verification systems, are also well known in the art. Global positioning systems are satellite based systems for geographic location and are commonly used for navigation purposes in smartphones. In this way, modern smartphones can provide the location information to a user located almost anywhere on Earth. Global positioning features are used in a variety of applications and for a variety of purposes. Smartphone global position, such as navigation requires "real-time" updating such that the user can frequently see updates with respect to their location, often within feet or inches of accuracy of real world location. This enables modern navigation by providing accurate and real time location information via a steady stream of frequent updates, and the like. This is advantageous for navigation using a smartphone.

In this way, current smartphone and related technologies are able to provide accurate, and up to date location information for a smart device. However, the geographic location of a particular user or individual is not captured, but rather the geographic location of the smart device itself. Furthermore, and said another way, capturing the smartphone location does not capture nor guarantee that a user or owner of that device is at the given location.

Biometric authentication is known in the art. Biometric authentication is a process which utilizes a biological characteristic of an individual to verify who that individual is. This security process often uses stored information from a computer memory, such as a fingerprint to confirm this information. Biometric authentication has recently entered the state of the art as a way for a smartphone user to verify who they are and unlock their smartphone through finger print access.

Taxes are well known in the art. Taxes are a financial levy on a society. These payments from members of a society are utilized by governments and often times are seen imposed on the federal and state levels of governments, as well as other levels. Residents belong to particular jurisdictions and are taxed based on where they reside, where they live, where they spend their time, where they travel, and the like. In many cases, tax and calculating taxes is a very time and labor intensive process, just in figuring out to what entity or government a person should pay taxes to.

Visas are also known in the art. Visas come in many different forms. Visas may be travel visas, student visas, work visas, a combination thereof, or similar. Visas are a conditional authorization granted by a government which allows a person to enter a jurisdiction. Visas are typically limited to a particular amount of time or duration and usually require a person to renew or leave the jurisdiction at the expiration of the visa. Tracking time and location of individuals in a jurisdiction has been done by paperwork, and has been a near impossible task in the state of the art, relying on mountains of checklists that oftentimes are never reviewed by anyone. This often results in a failure of systems related to visas.

Tracking residency and location for taxes and visas is complicated. A system for successfully achieving the needs of such systems does not exist in the art and has not existed in the art due to a lack of ability to execute such a system. Thus, there is a long-felt need in the art for a reliable system which can verify the actual location of a person at desired time intervals for various purposes.

The disclosure herein provides these advantages and others as will become clear from the specification and claims provided.

SUMMARY OF THE INVENTION

An identification system, a geographic location verification system, a system for verifying an identification in a geographic location, processes of authenticating, and methods of use are presented. More specifically, and without limitation, the present disclosure relates to a system for accurately tracking the quantity of time an authenticated user spends in a physical location. More specifically, and without limitation, the present disclosure relates to a system for accurately tracking the quantity of time a user spends in a physical location.

Many complications plague these areas of art. For example, tracking residency and location for taxes and visas is complicated. A system for successfully achieving the needs of such systems does not exist in the art and has not existed in the art due to a lack of ability to execute such a system. Thus, there is a long-felt need in the art for a reliable system which can verify the actual location of a person at desired time intervals for various purposes. Thus, the present disclosure provides a system, solutions to these problems, and more.

Thus, it is a primary object of the disclosure to provide an identification system, a geographic location verification system, a system for verifying an identification in a geographic location, processes of authenticating, and methods of use that provides a biometric geographic location verification system at desired time intervals.

Another object of the disclosure is to provide an identification system, a geographic location verification system, a system for verifying an identification in a geographic location, processes of authenticating, and methods of use that verifies the location of a user.

Yet another object of the disclosure is to provide an identification system, a geographic location verification system, a system for verifying an identification in a geographic location, processes of authenticating, and methods of use that verifies the time a location of a user was captured.

Another object of the disclosure is to provide an identification system, a geographic location verification system, a system for verifying an identification in a geographic location, processes of authenticating, and methods of use that biometrically verifies the location of a user.

Yet another object of the disclosure is to provide an identification system, a geographic location verification system, a system for verifying an identification in a geographic location, processes of authenticating, and methods of use that provides a mobile application.

Another object of the disclosure is to provide an identification system, a geographic location verification system, a system for verifying an identification in a geographic location, processes of authenticating, and methods of use that provide an easy to use interface.

Yet another object of the disclosure is to provide an identification system, a geographic location verification system, a system for verifying an identification in a geographic location, processes of authenticating, and methods of use that accurately tracks the amount of time a user spends in a geographic or physical location.

Another object of the disclosure is to provide an identification system, a geographic location verification system, a system for verifying an identification in a geographic location, processes of authenticating, and methods of use that can be used for tax residency.

Yet another object of the disclosure is to provide an identification system, a geographic location verification system, a system for verifying an identification in a geographic location, processes of authenticating, and methods of use that can be used for work visas.

Another object of the disclosure is to provide an identification system, a geographic location verification system, a system for verifying an identification in a geographic location, processes of authenticating, and methods of use that can be used for student visas.

Yet another object of the disclosure is to provide an identification system, a geographic location verification system, a system for verifying an identification in a geographic location, processes of authenticating, and methods of use that can be used for travel goals.

Another object of the disclosure is to provide an identification system, a geographic location verification system, a system for verifying an identification in a geographic location, processes of authenticating, and methods of use that verifies the smart device being located is at the same location as a user.

Yet another object of the disclosure is to provide an identification system, a geographic location verification system, a system for verifying an identification in a geographic location, processes of authenticating, and methods of use that combine physical location of the device with the presence of the user.

Another object of the disclosure is to provide an identification system, a geographic location verification system, a system for verifying an identification in a geographic location, processes of authenticating, and methods of use that combine physical geographic location of a smart device with the presence of a user through biometric authentication.

Yet another object of the disclosure is to provide an identification system, a geographic location verification system, a system for verifying an identification in a geographic location, processes of authenticating, and methods of use that automatically verifies and provides alerts at predetermined intervals.

Another object of the disclosure is to provide an identification system, a geographic location verification system, a system for verifying an identification in a geographic location, processes of authenticating, and methods of use that automatically verifies without the need for interaction from a user.

Yet another object of the disclosure is to provide an identification system, a geographic location verification system, a system for verifying an identification in a geographic location, processes of authenticating, and methods of use that automatically logs location at each login to the smart device using biometric authentication.

Another object of the disclosure is to provide an identification system, a geographic location verification system, a system for verifying an identification in a geographic location, processes of authenticating, and methods of use that initiates location logging events for biometric identification.

Yet another object of the disclosure is to provide an identification system, a geographic location verification system, a system for verifying an identification in a geographic location, processes of authenticating, and methods of use that utilizes existing biometric features of a smart device.

Another object of the disclosure is to provide an identification system, a geographic location verification system, a system for verifying an identification in a geographic location, processes of authenticating, and methods of use that includes an add-on system which works with a smart device.

Yet another object of the disclosure is to provide an identification system, a geographic location verification system, a system for verifying an identification in a geographic location, processes of authenticating, and methods of use that is a standalone system.

Another object of the disclosure is to provide an identification system, a geographic location verification system, a system for verifying an identification in a geographic location, processes of authenticating, and methods of use that provides for a user to verify location at any time.

Yet another object of the disclosure is to provide an identification system, a geographic location verification system, a system for verifying an identification in a geographic location, processes of authenticating, and methods of use that utilizes biometrics for identity authentication.

Another object of the disclosure is to provide an identification system, a geographic location verification system, a system for verifying an identification in a geographic location, processes of authenticating, and methods of use that can create and manage goals.

Yet another object of the disclosure is to provide an identification system, a geographic location verification system, a system for verifying an identification in a geographic location, processes of authenticating, and methods of use that incorporate various tax laws.

Another object of the disclosure is to provide an identification system, a geographic location verification system, a system for verifying an identification in a geographic location, processes of authenticating, and methods of use that incorporate various visa and residency laws.

Yet another object of the disclosure is to provide an identification system, a geographic location verification system, a system for verifying an identification in a geographic location, processes of authenticating, and methods of use that autonomously update goals and provides notifications of achievements.

Another object of the disclosure is to provide an identification system, a geographic location verification system, a system for verifying an identification in a geographic location, processes of authenticating, and methods of use that include gamification features.

Yet another object of the disclosure is to provide an identification system, a geographic location verification system, a system for verifying an identification in a geographic location, processes of authenticating, and methods of use that tracks historical data.

Another object of the disclosure is to provide an identification system, a geographic location verification system, a system for verifying an identification in a geographic location, processes of authenticating, and methods of use that actively tracks, stores, and analyzes location data and time.

Yet another object of the disclosure is to provide an identification system, a geographic location verification system, a system for verifying an identification in a geographic location, processes of authenticating, and methods of use that includes a timeline and history.

Another object of the disclosure is to provide an identification system, a geographic location verification system, a system for verifying an identification in a geographic location, processes of authenticating, and methods of use that includes a timeline of all verified and unverified events.

Yet another object of the disclosure is to provide an identification system, a geographic location verification system, a system for verifying an identification in a geographic location, processes of authenticating, and methods of use that provide travel analytics.

Another object of the disclosure is to provide an identification system, a geographic location verification system, a system for verifying an identification in a geographic location, processes of authenticating, and methods of use that provide visualizations of analytics.

Yet another object of the disclosure is to provide an identification system, a geographic location verification system, a system for verifying an identification in a geographic location, processes of authenticating, and methods of use that includes report generation.

Another object of the disclosure is to provide an identification system, a geographic location verification system, a system for verifying an identification in a geographic location, processes of authenticating, and methods of use that provide for exporting information.

Yet another object of the disclosure is to provide an identification system, a geographic location verification system, a system for verifying an identification in a geographic location, processes of authenticating, and methods of use that provide report generation and automatic uploading to various government agencies.

Another object of the disclosure is to provide an identification system, a geographic location verification system, a system for verifying an identification in a geographic location, processes of authenticating, and methods of use that utilize biometric authentication to verify the physical presence of a user.

Yet another object of the disclosure is to provide an identification system, a geographic location verification system, a system for verifying an identification in a geographic location, processes of authenticating, and methods of use that integrate with a mobile device.

Another object of the disclosure is to provide an identification system, a geographic location verification system, a system for verifying an identification in a geographic location, processes of authenticating, and methods of use that can work on a variety of interfaces and smart devices.

Yet another object of the disclosure is to provide an identification system, a geographic location verification system, a system for verifying an identification in a geographic location, processes of authenticating, and methods of use that can utilize various connectivity types such as bluetooth, NFC, Wifi, a combination thereof, and the like.

Another object of the disclosure is to provide an identification system, a geographic location verification system, a system for verifying an identification in a geographic location, processes of authenticating, and methods of use that interact with other systems to provide city, state, country information, and the like.

Yet another object of the disclosure is to provide an identification system, a geographic location verification system, a system for verifying an identification in a geographic location, processes of authenticating, and methods of use that time stamps data.

Another object of the disclosure is to provide an identification system, a geographic location verification system, a system for verifying an identification in a geographic location, processes of authenticating, and methods of use that can be used to manage tax residency.

Yet another object of the disclosure is to provide an identification system, a geographic location verification system, a system for verifying an identification in a geographic location, processes of authenticating, and methods of use that handles visa tracking, such as but not limited to, work visa, travel visa, student visa, investor visa, a combination thereof and the like.

Another object of the disclosure is to provide an identification system, a geographic location verification system, a system for verifying an identification in a geographic location, processes of authenticating, and methods of use that provide travel analytic statistics.

Yet another object of the disclosure is to provide an identification system, a geographic location verification system, a system for verifying an identification in a geographic location, processes of authenticating, and methods of use that provide report creation.

Another object of the disclosure is to provide an identification system, a geographic location verification system, a system for verifying an identification in a geographic location, processes of authenticating, and methods of use that provide goal setting.

Yet another object of the disclosure is to provide an identification system, a geographic location verification system, a system for verifying an identification in a geographic location, processes of authenticating, and methods of use that provide various summary data and customizable dashboard display data options.

Another object of the disclosure is to provide an identification system, a geographic location verification system, a system for verifying an identification in a geographic location, processes of authenticating, and methods of use that work with a variety of biometric verification methods.

Yet another object of the disclosure is to provide an identification system, a geographic location verification system, a system for verifying an identification in a geographic location, processes of authenticating, and methods of use that may be used with facial recognition.

Another object of the disclosure is to provide an identification system, a geographic location verification system, a system for verifying an identification in a geographic location, processes of authenticating, and methods of use that may be used with fingerprint scanning.

Yet another object of the disclosure is to provide an identification system, a geographic location verification system, a system for verifying an identification in a geographic location, processes of authenticating, and methods of use that may be used with retinal scanning.

Another object of the disclosure is to provide an identification system, a geographic location verification system, a system for verifying an identification in a geographic location, processes of authenticating, and methods of use that may be used with DNA scanning.

Yet another object of the disclosure is to provide an identification system, a geographic location verification system, a system for verifying an identification in a geographic location, processes of authenticating, and methods of use that integrate image capture verification.

Another object of the disclosure is to provide an identification system, a geographic location verification system, a system for verifying an identification in a geographic location, processes of authenticating, and methods of use that integrate live chat and video call verification.

Yet another object of the disclosure is to provide an identification system, a geographic location verification system, a system for verifying an identification in a geographic location, processes of authenticating, and methods of use that includes third party verification systems.

Another object of the disclosure is to provide an identification system, a geographic location verification system, a system for verifying an identification in a geographic location, processes of authenticating, and methods of use that includes third party site verification.

Yet another object of the disclosure is to provide an identification system, a geographic location verification system, a system for verifying an identification in a geographic location, processes of authenticating, and methods of use that work without GPS.

Another object of the disclosure is to provide an identification system, a geographic location verification system, a system for verifying an identification in a geographic location, processes of authenticating, and methods of use that utilize MGPS.

Yet another object of the disclosure is to provide an identification system, a geographic location verification system, a system for verifying an identification in a geographic location, processes of authenticating, and methods of use that utilize wifi geographic location.

Another object of the disclosure is to provide an identification system, a geographic location verification system, a system for verifying an identification in a geographic location, processes of authenticating, and methods of use that use internet protocol addresses for location.

Yet another object of the disclosure is to provide an identification system, a geographic location verification system, a system for verifying an identification in a geographic location, processes of authenticating, and methods of use that utilize triangulation.

Another object of the disclosure is to provide an identification system, a geographic location verification system, a system for verifying an identification in a geographic location, processes of authenticating, and methods of use that run autonomously.

Yet another object of the disclosure is to provide an identification system, a geographic location verification system, a system for verifying an identification in a geographic location, processes of authenticating, and methods of use that track historical data.

Another object of the disclosure is to provide an identification system, a geographic location verification system, a system for verifying an identification in a geographic location, processes of authenticating, and methods of use that provide alerts.

Yet another object of the disclosure is to provide an identification system, a geographic location verification system, a system for verifying an identification in a geographic location, processes of authenticating, and methods of use that are easy to use.

Another object of the disclosure is to provide an identification system, a geographic location verification system, a system for verifying an identification in a geographic location, processes of authenticating, and methods of use that utilize global positioning systems.

Yet another object of the disclosure is to provide an identification system, a geographic location verification system, a system for verifying an identification in a geographic location, processes of authenticating, and methods of use that are safe to use.

Another object of the disclosure is to provide an identification system, a geographic location verification system, a system for verifying an identification in a geographic location, processes of authenticating, and methods of use that are accurate.

Yet another object of the disclosure is to provide an identification system, a geographic location verification system, a system for verifying an identification in a geographic location, processes of authenticating, and methods of use that maintain confidentiality.

Another object of the disclosure is to provide an identification system, a geographic location verification system, a system for verifying an identification in a geographic location, processes of authenticating, and methods of use that can be used with various digital platforms.

Yet another object of the disclosure is to provide an identification system, a geographic location verification system, a system for verifying an identification in a geographic location, processes of authenticating, and methods of use that are quick and efficient.

Another object of the disclosure is to provide an identification system, a geographic location verification system, a system for verifying an identification in a geographic location, processes of authenticating, and methods of use that save time for a user.

Yet another object of the disclosure is to provide an identification system, a geographic location verification system, a system for verifying an identification in a geographic location, processes of authenticating, and methods of use that are robust.

Another object of the disclosure is to provide an identification system, a geographic location verification system, a system for verifying an identification in a geographic location, processes of authenticating, and methods of use that are high quality.

These and other objects, features, or advantages of the present disclosure will become apparent from the specification and claims.

FIELD OF THE INVENTION

This disclosure relates to an identification system, a geographic location verification system, a system for verifying an identification in a geographic location, processes of authenticating, and methods of use. More specifically, and without limitation, the present disclosure relates to a system for accurately tracking the quantity of time an authenticated user spends in a physical location. More specifically, and without limitation, the present disclosure relates to a system for accurately tracking the quantity of time a user spends in a physical location.

BRIEF DESCRIPTION OF FIGURES

The drawings accompanying and forming part of this specification are included to depict certain aspects of the disclosure.

FIG. 12 is a diagram illustrating features of one embodiment of the system; the view showing a user interface and some features of the user interface.

FIG. 14 is a diagram illustrating features of one embodiment of the system; the view showing a smart device and some of the components and/or features of the smart device in association with utilization and the like.

DETAILED DESCRIPTION

Figure 1:
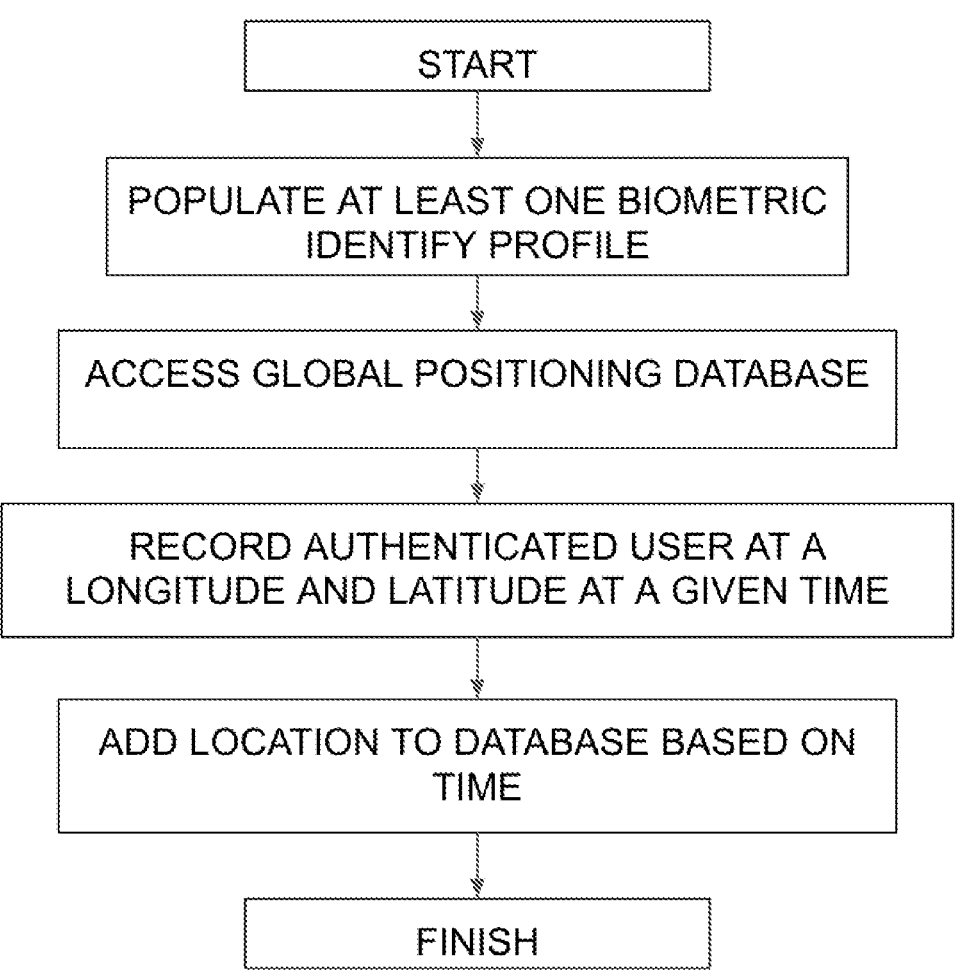
FIG. 1 is a flowchart illustrating an embodiment of the system; the flowchart showing one example of operation.
Figure 2:
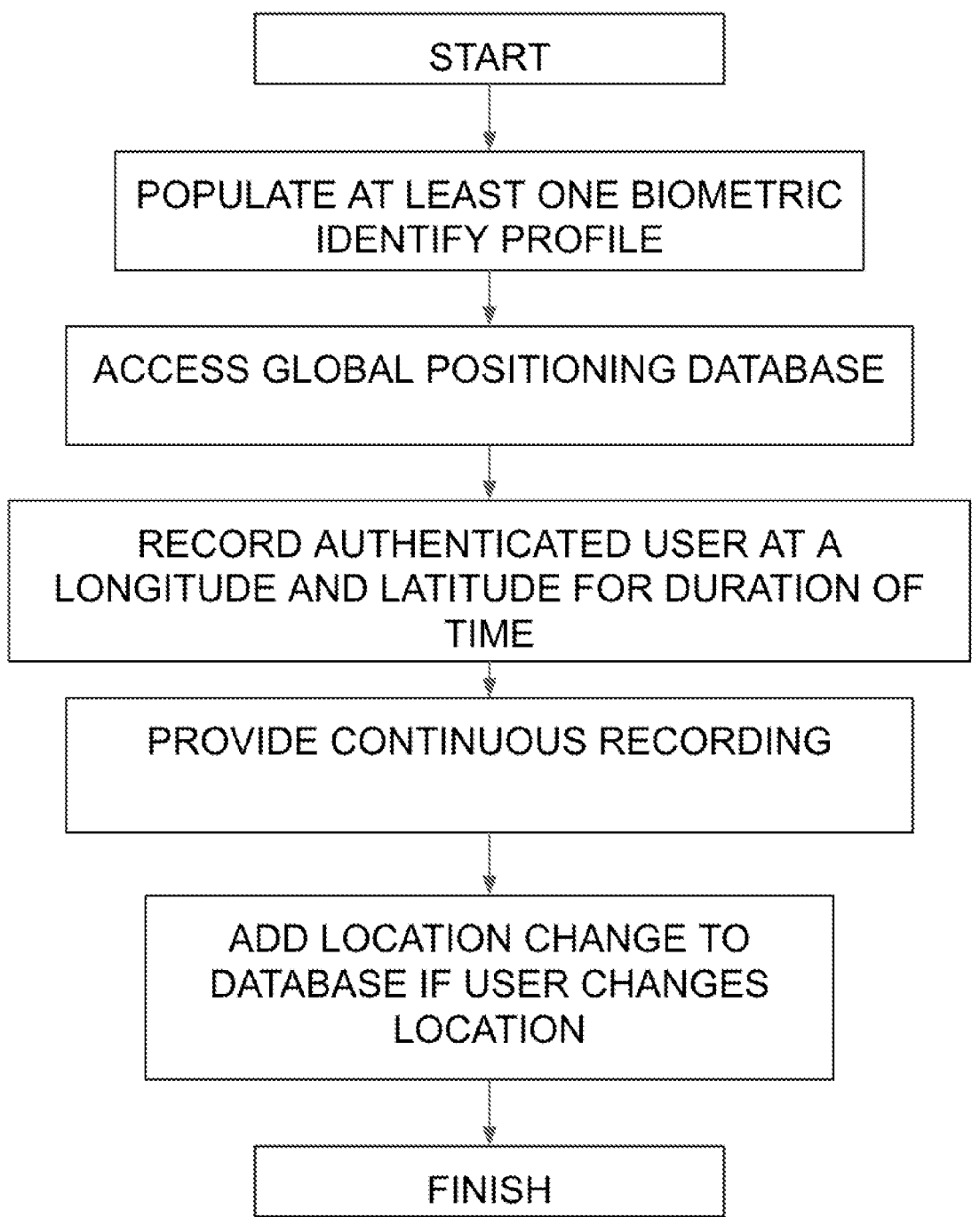
FIG. 2 is a flowchart illustrating an embodiment of the system; the flowchart showing one example of operation.
Figure 3:
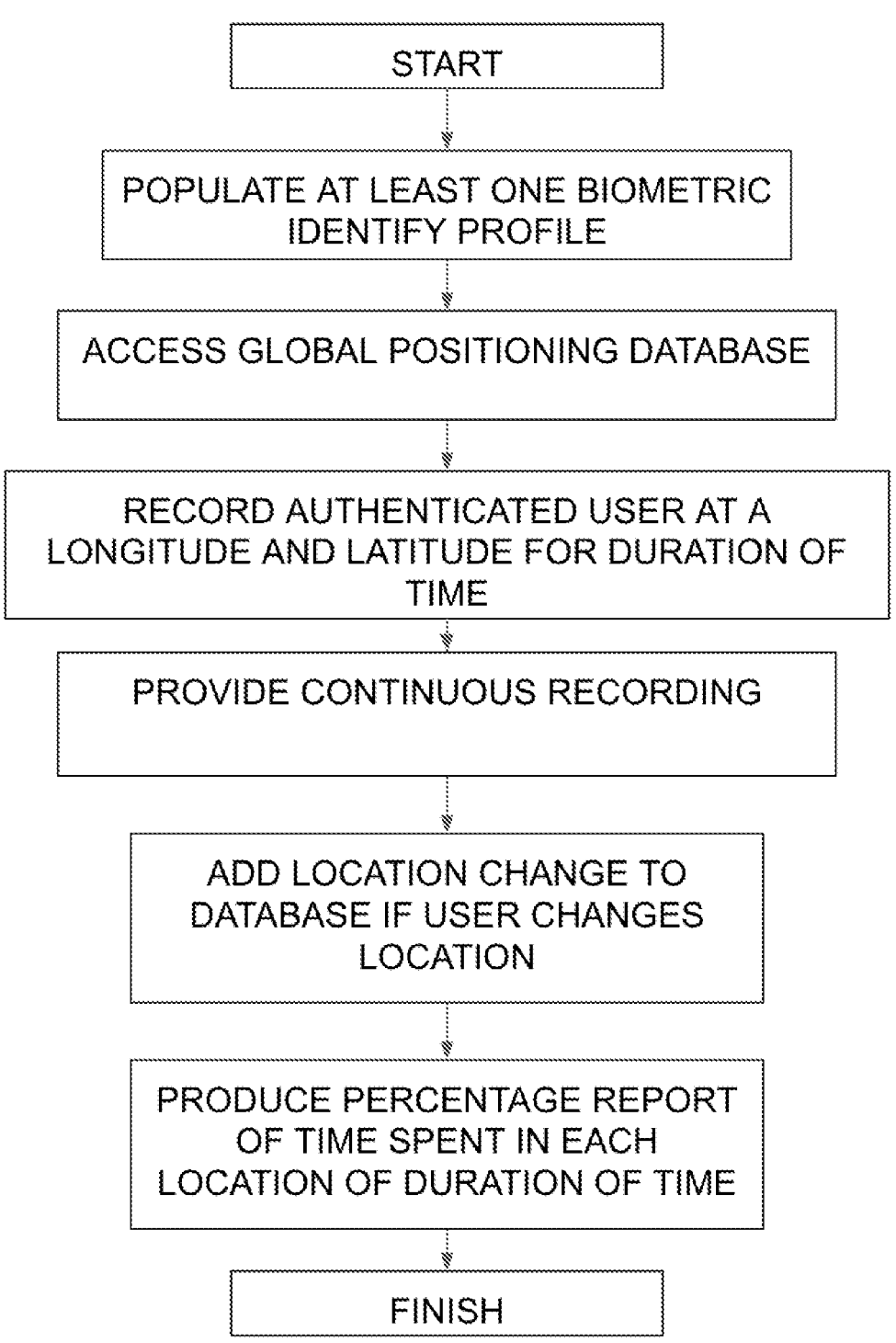
FIG. 3 is a flowchart illustrating an embodiment of the system; the flowchart showing one example of operation.
Figure 4:
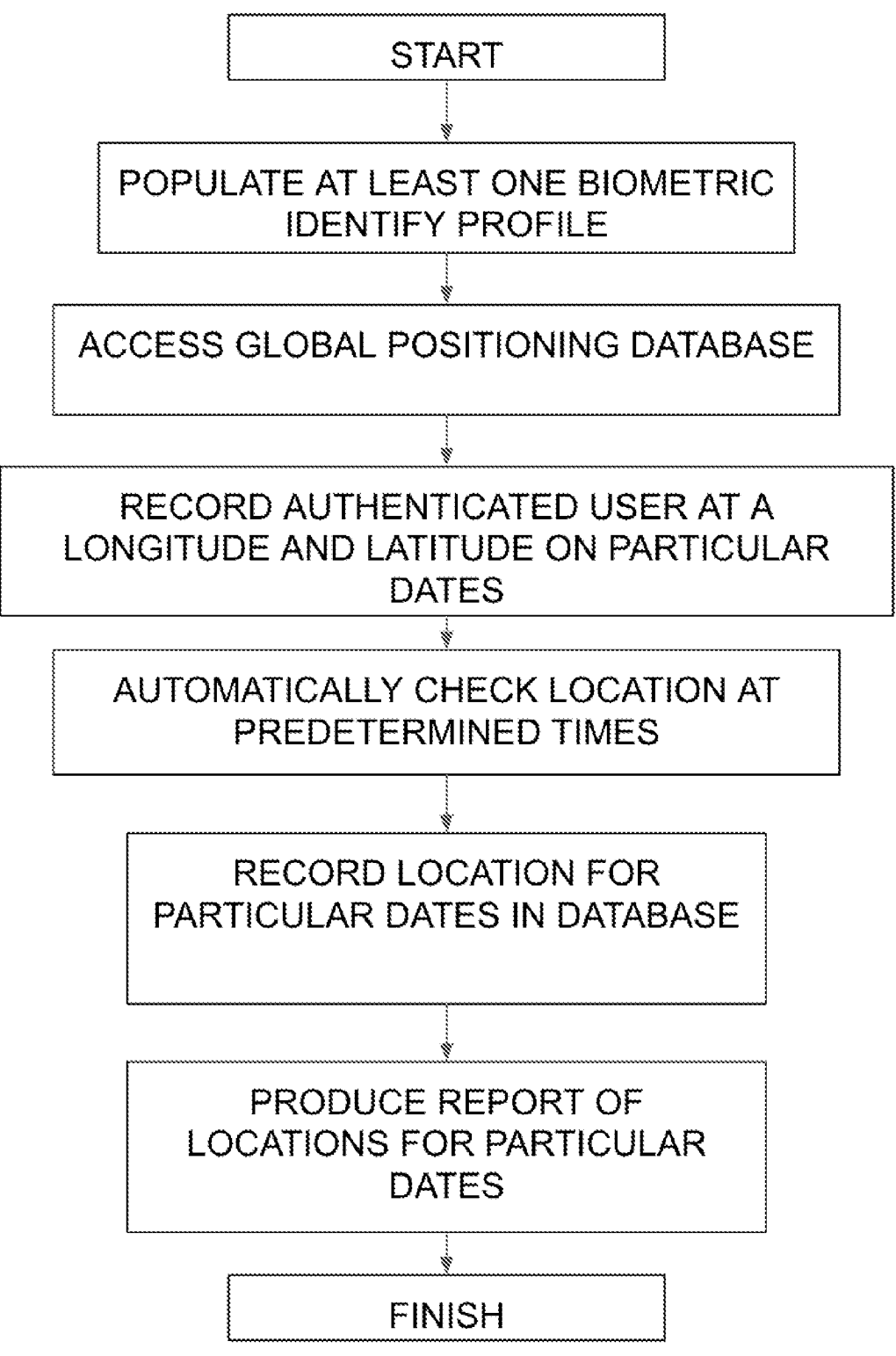
FIG. 4 is a flowchart illustrating an embodiment of the system; the flowchart showing one example of operation.
Figure 5:
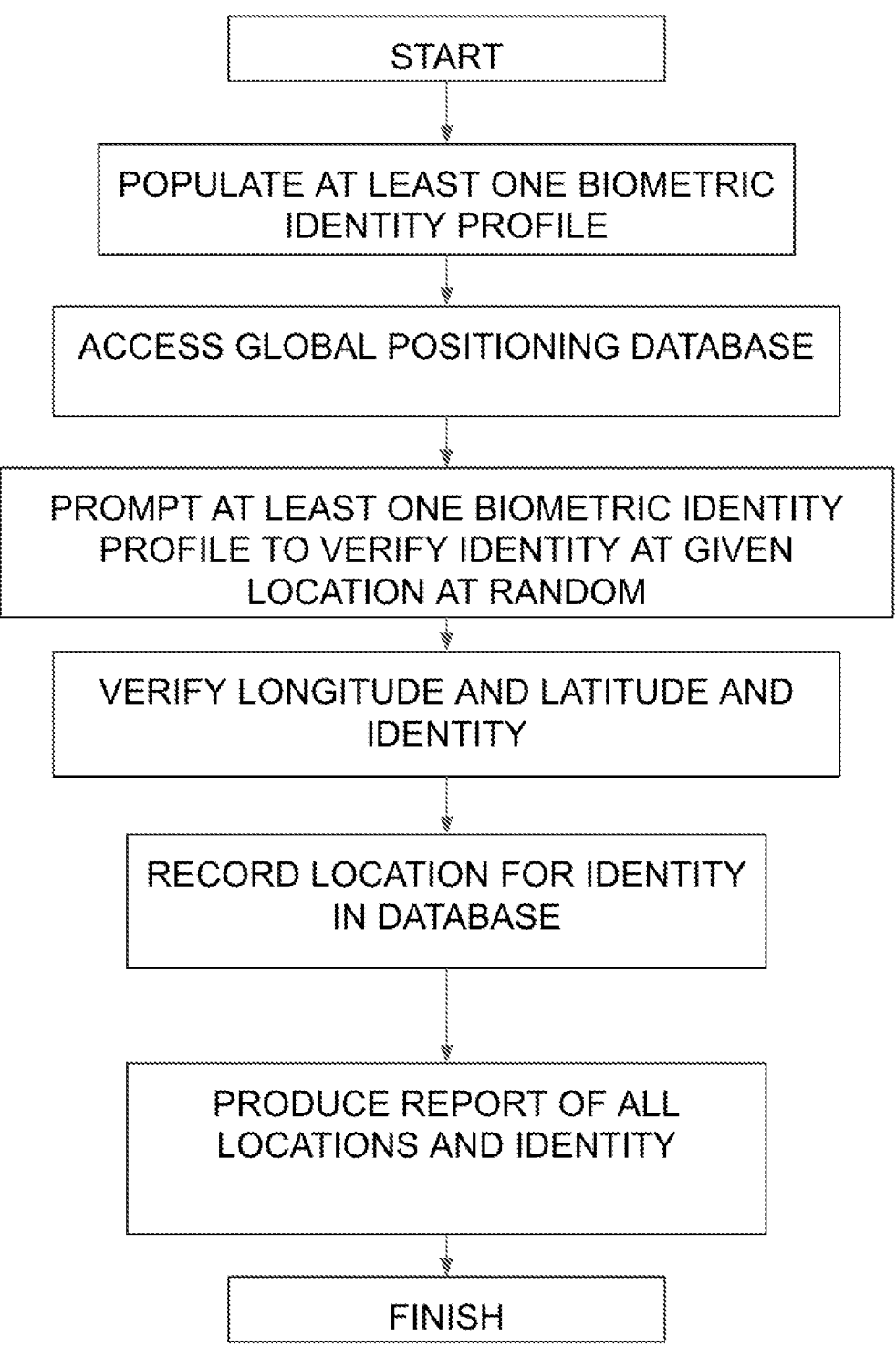
FIG. 5 is a flowchart illustrating an embodiment of the system; the flowchart showing one example of operation.
Figure 6:
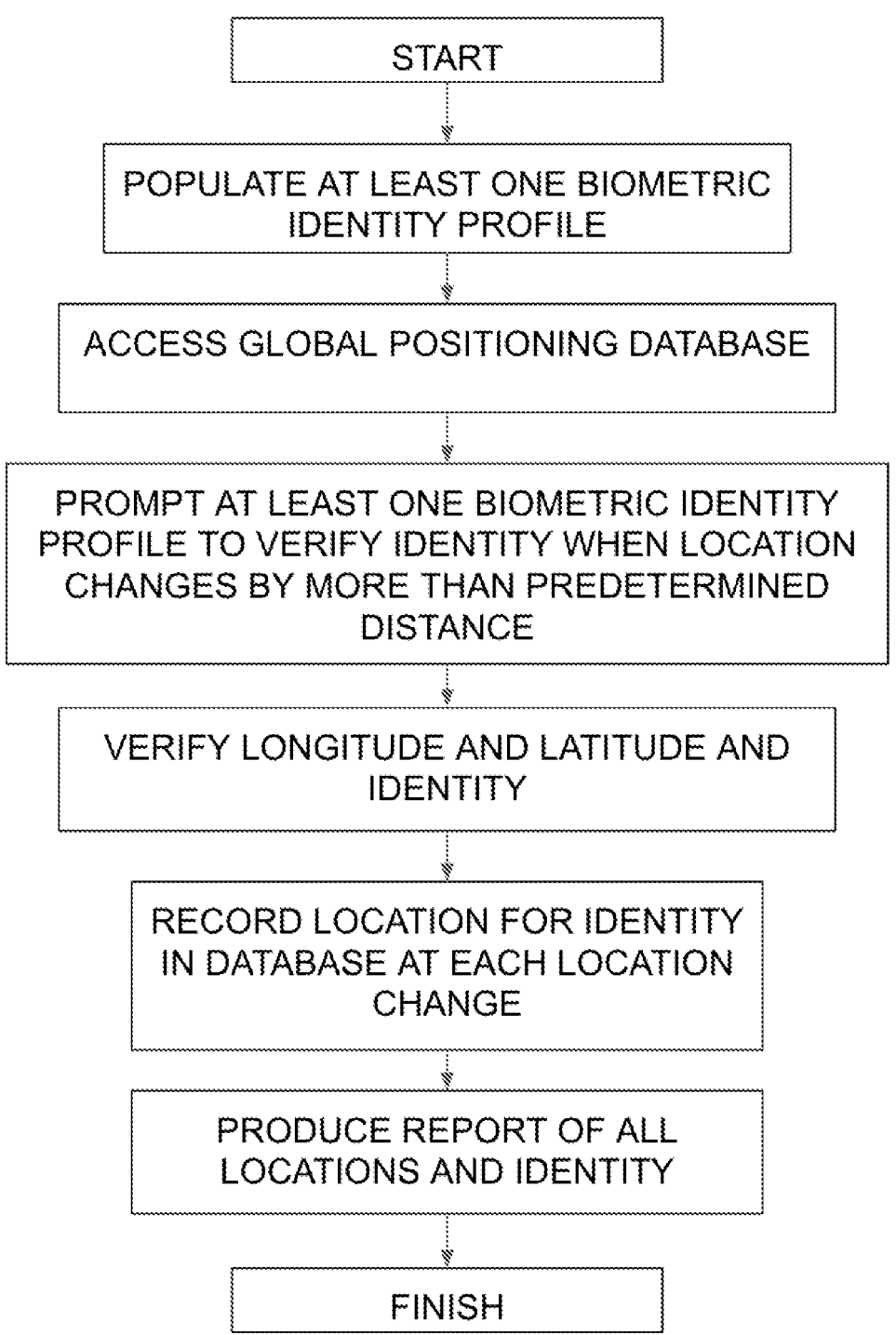
FIG. 6 is a flowchart illustrating an embodiment of the system; the flowchart showing one example of operation.
Figure 7:
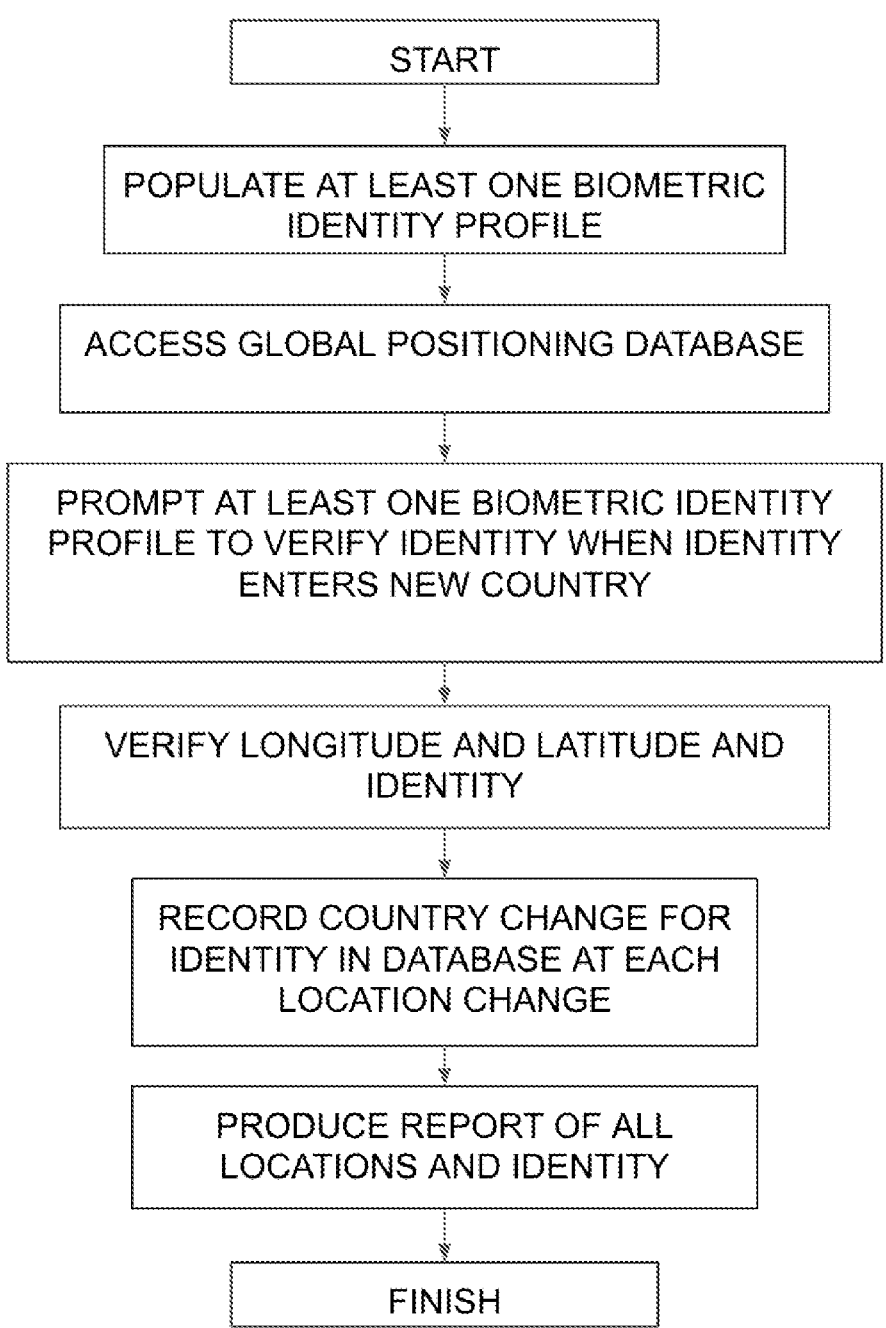
FIG. 7 is a flowchart illustrating an embodiment of the system; the flowchart showing one example of operation.
Figure 8:
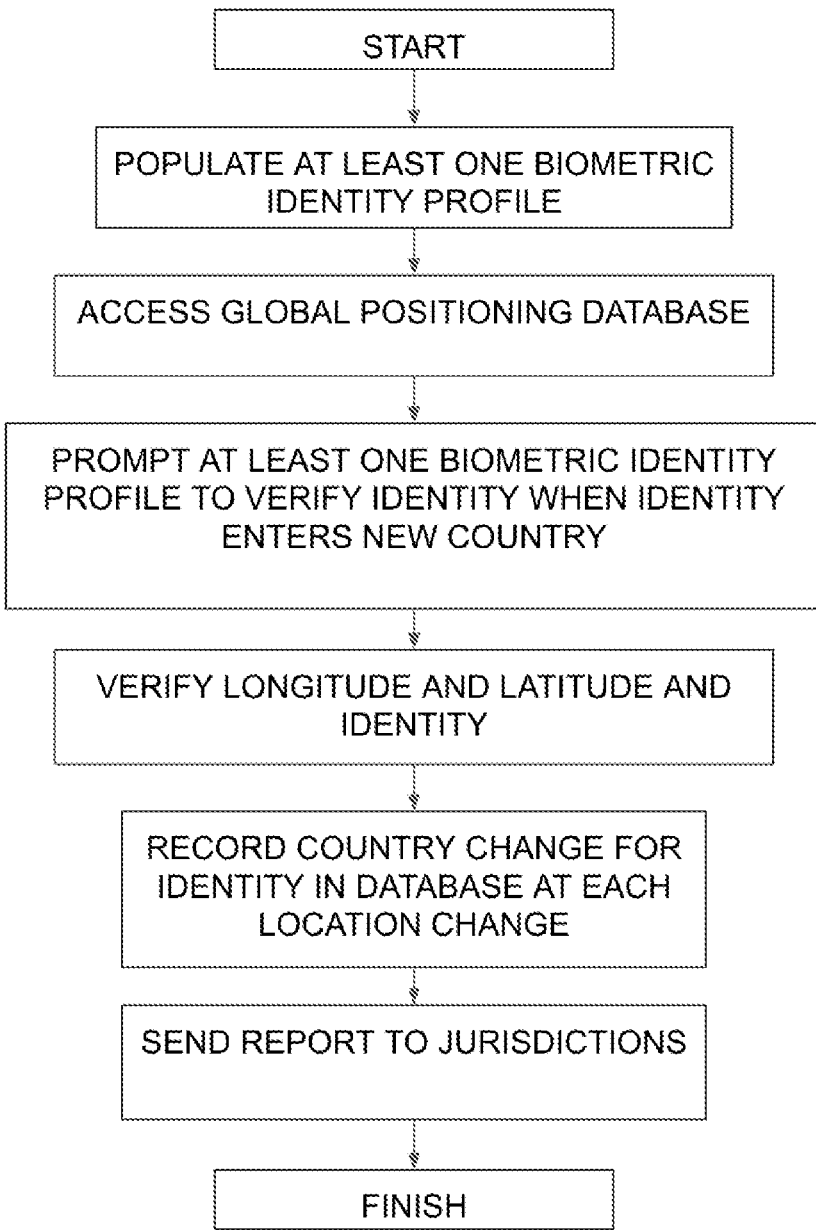
FIG. 8 is a flowchart illustrating an embodiment of the system; the flowchart showing one example of operation.
Figure 9:
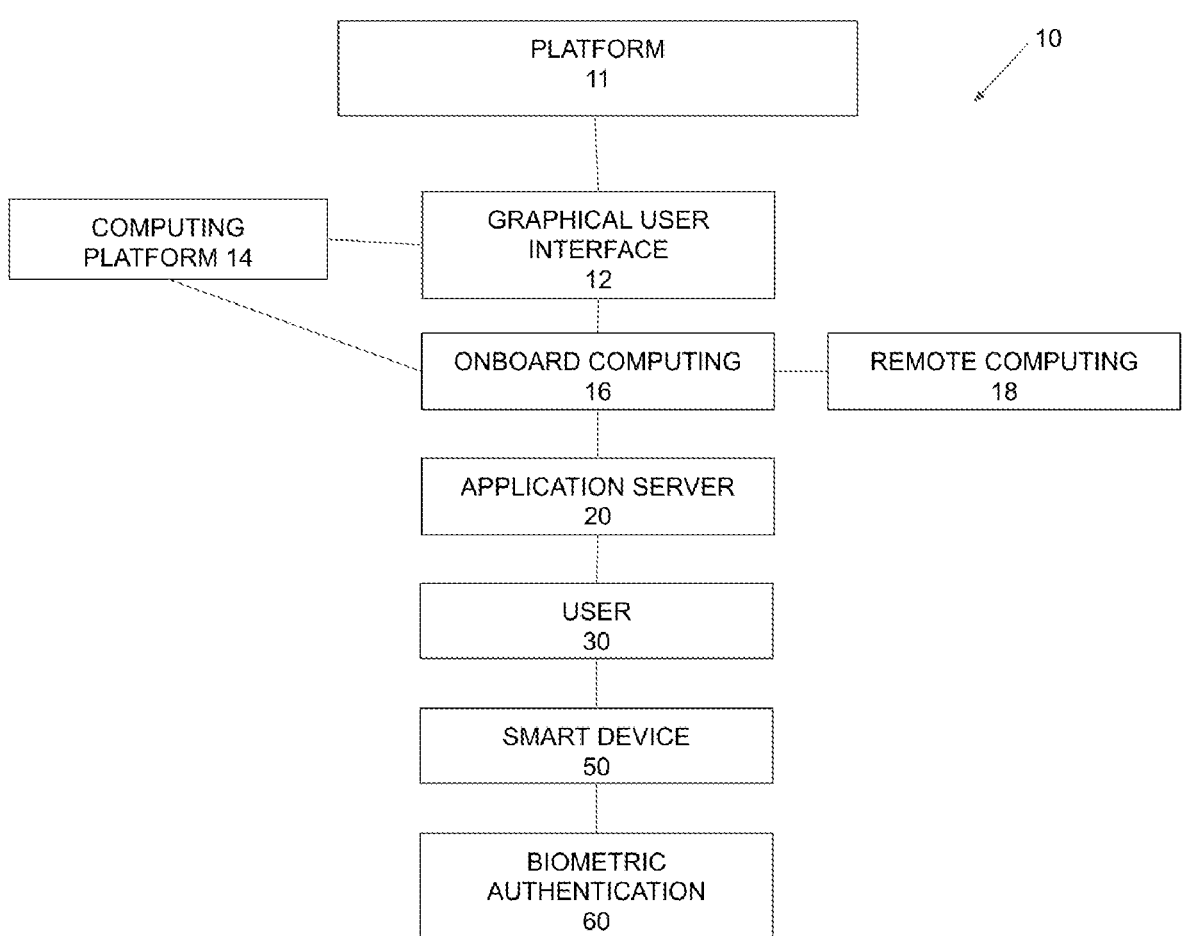
FIG. 9 is a flowchart illustrating an embodiment of the system; the flowchart showing one example of operation.
Figure 10:
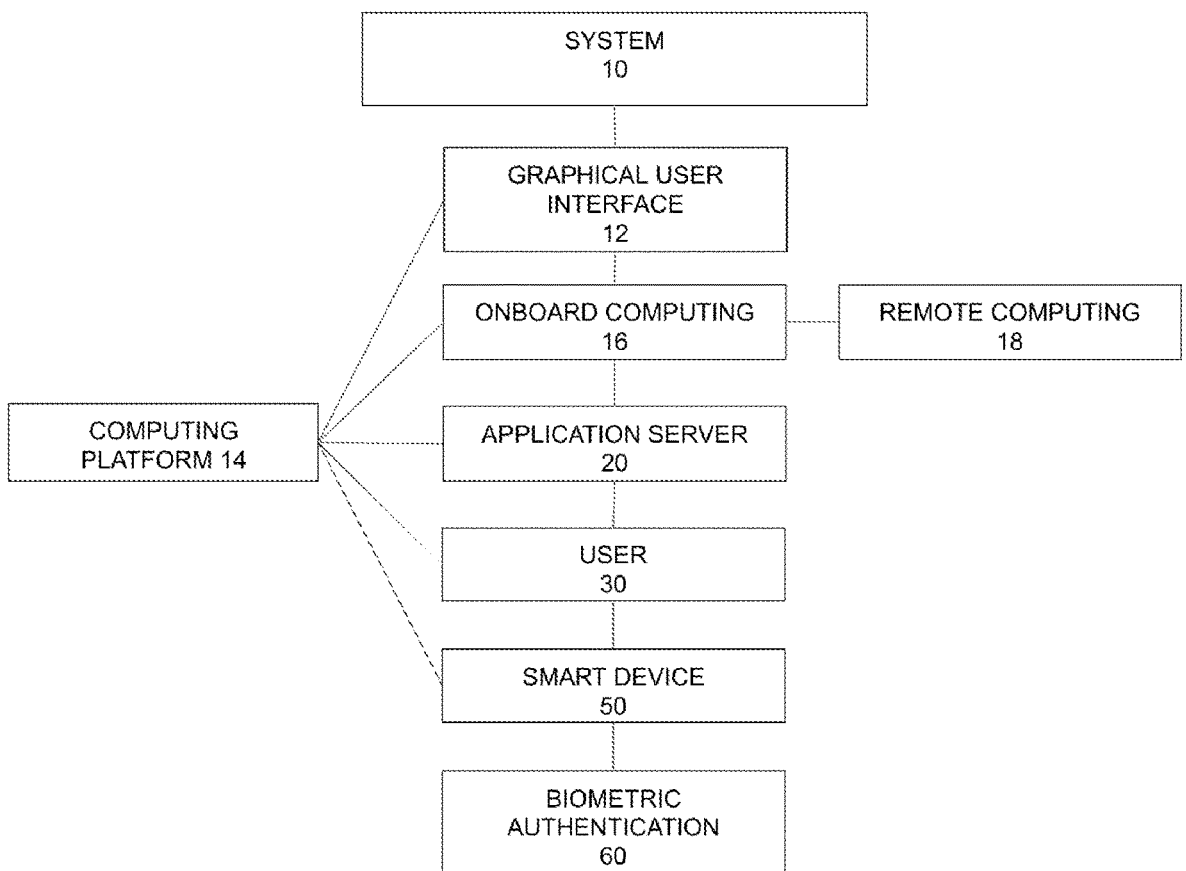
FIG. 10 is a diagram illustrating features of one embodiment of the system; the view showing the system association with a graphical user interface and computing platform associations.
Figure 11:
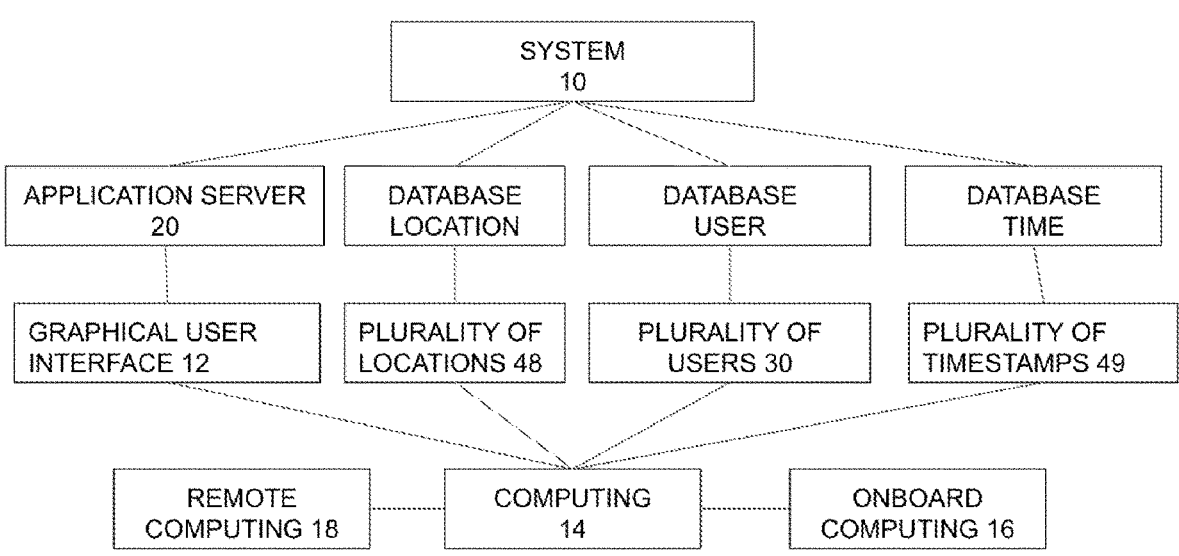
FIG. 11 is a diagram illustrating features of one embodiment of the system; the view showing the system association with a graphical user interface and computing platform associations.
Figure 13:
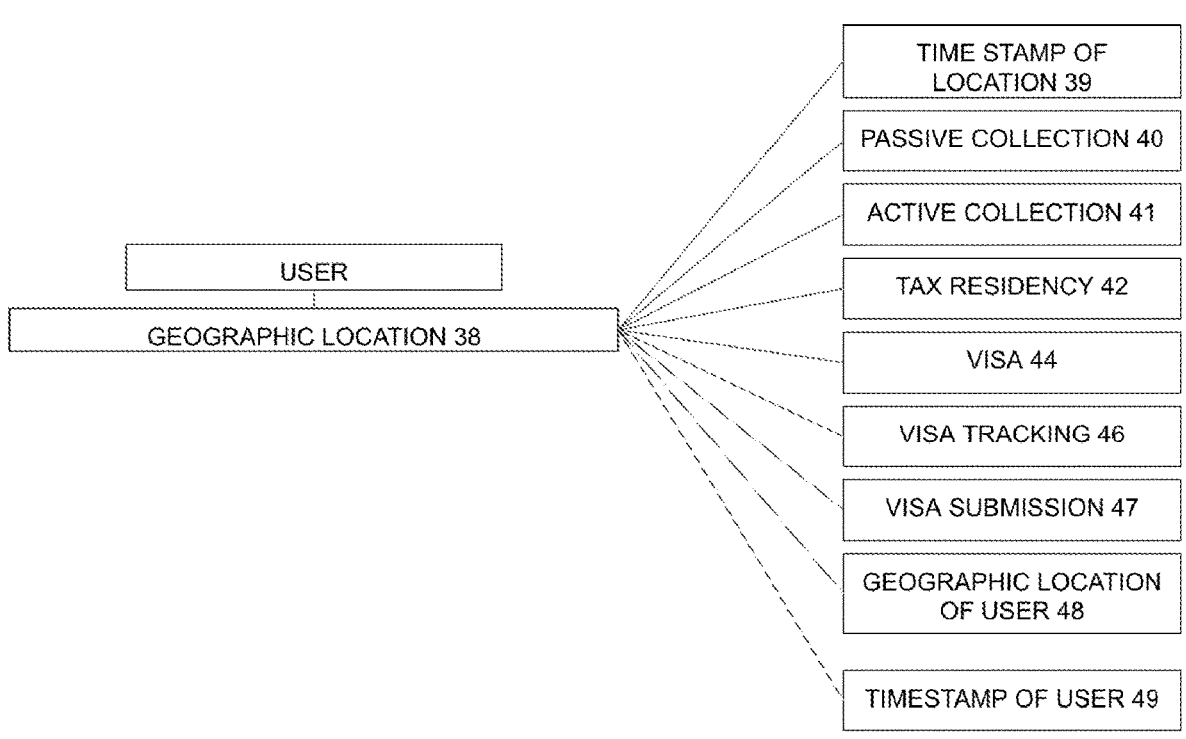
FIG. 13 is a diagram illustrating features of one embodiment of the system; the view showing geographic location and activity and features associated with geographic location.
Figure 14:
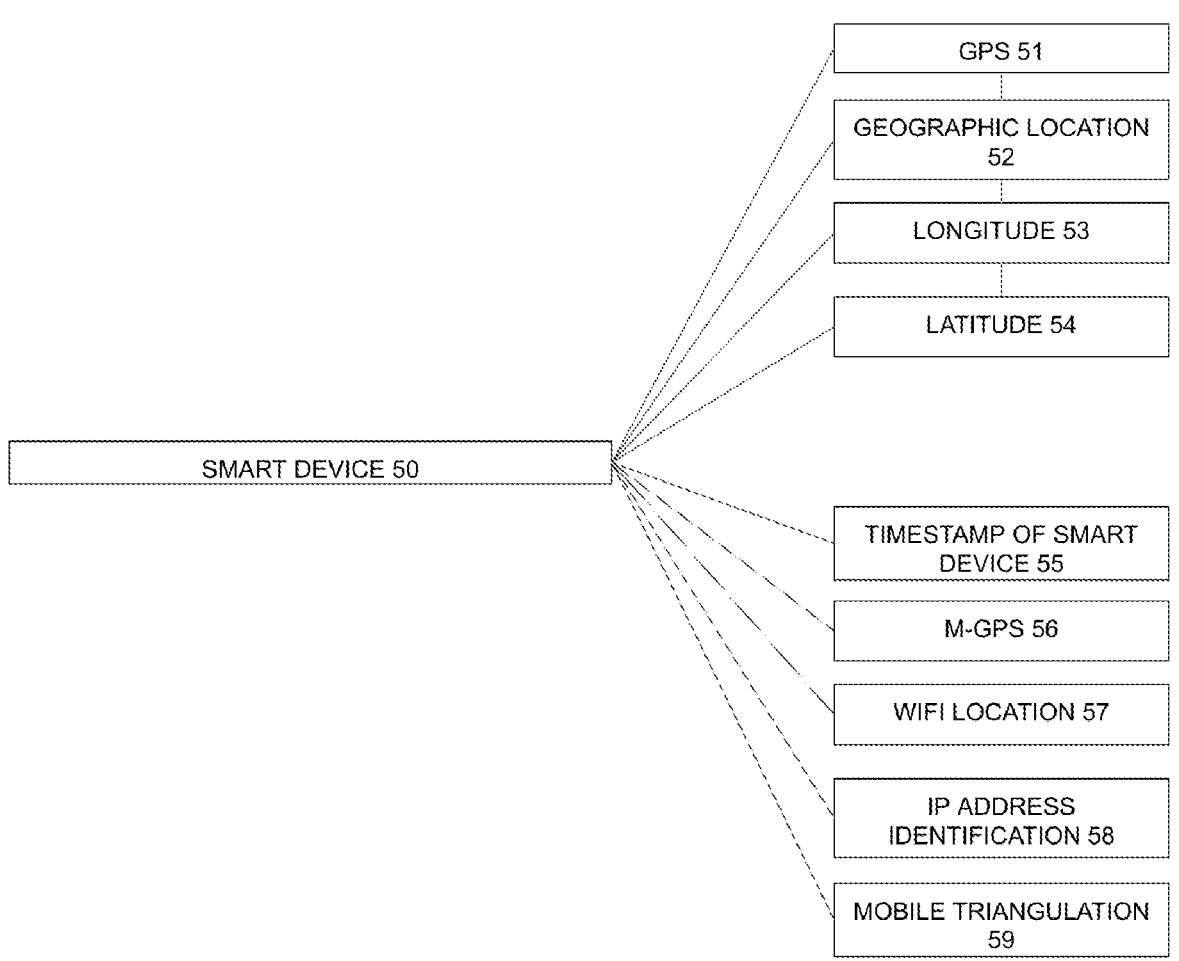
Figure 15:
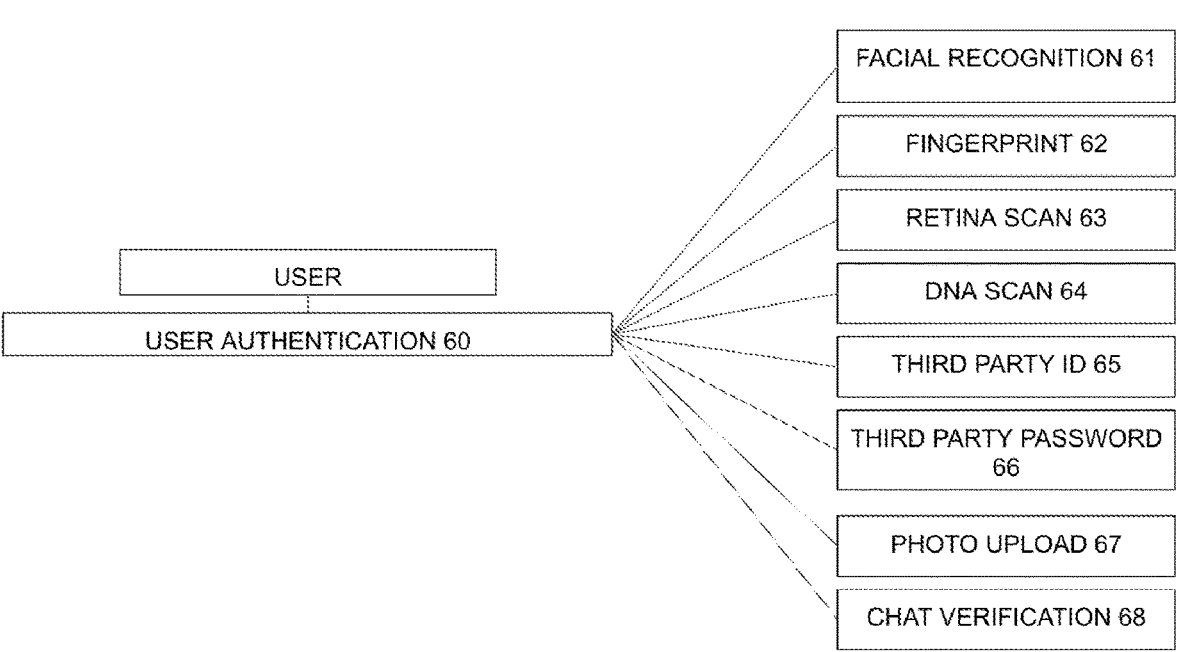
FIG. 15 is a diagram illustrating features of one embodiment of the system; the view showing various authentication options and features.
Figure 16:
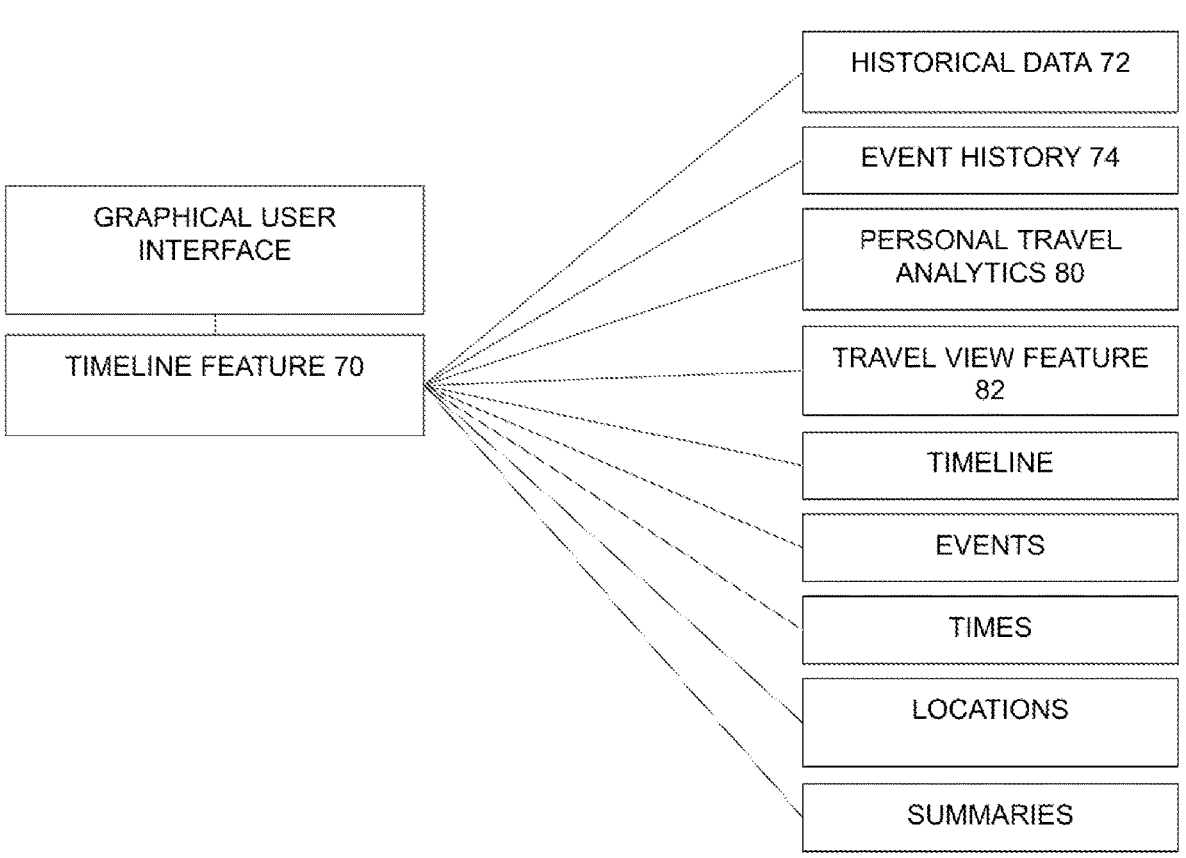
FIG. 16 is a diagram illustrating features of one embodiment of the system; the view showing various timeline features and functionalities.
Figure 17:
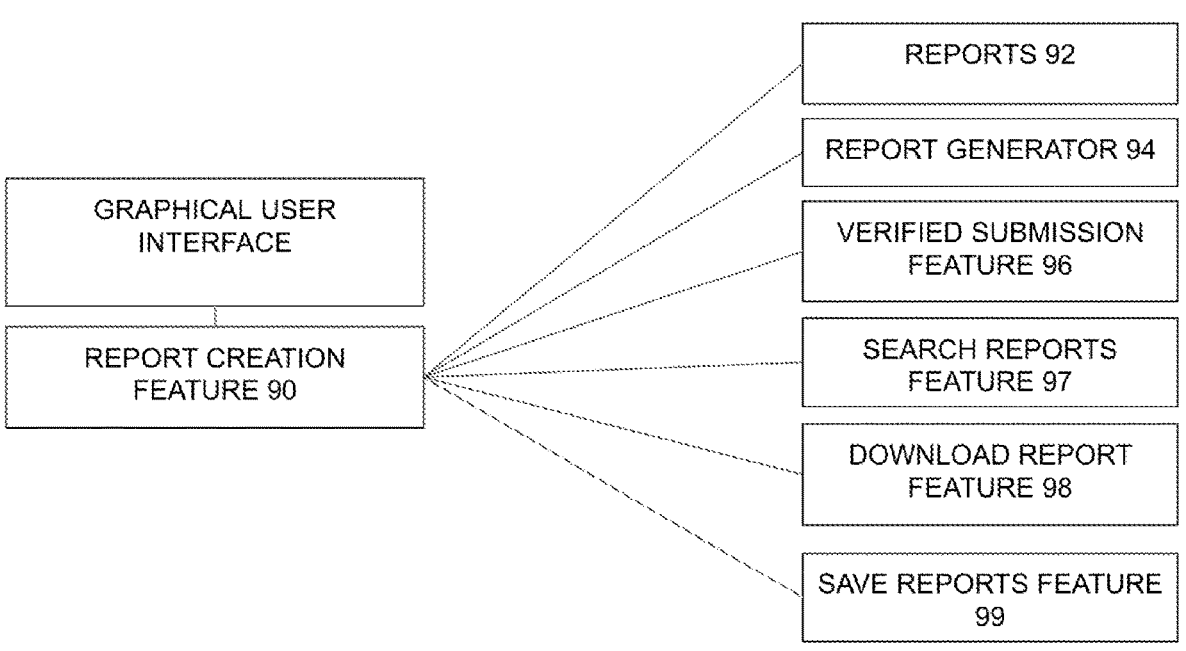
FIG. 17 is a diagram illustrating features of one embodiment of the system; the view showing some features of the reporting system.
Figure 18:
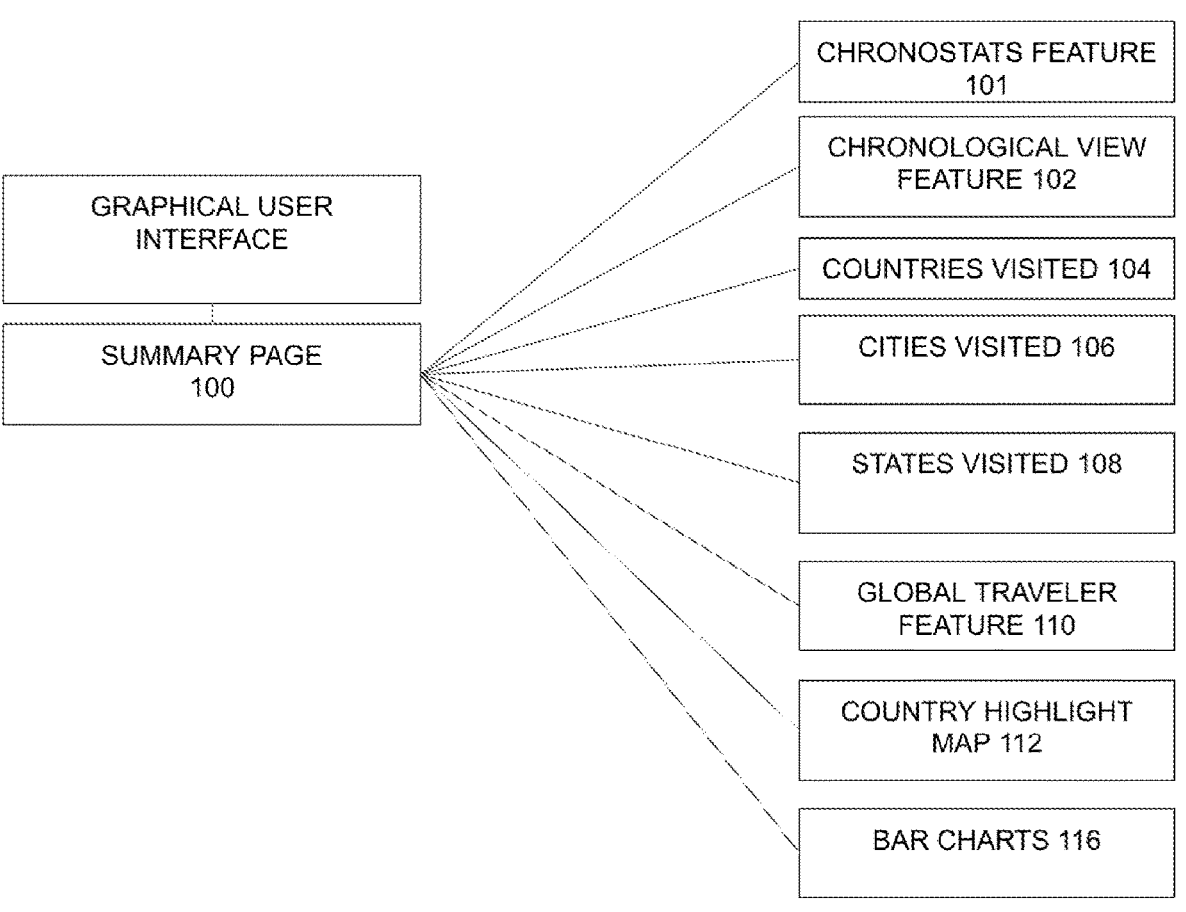
FIG. 18 is a diagram illustrating features of one embodiment of the system; the view showing summarization features.
Figure 19:
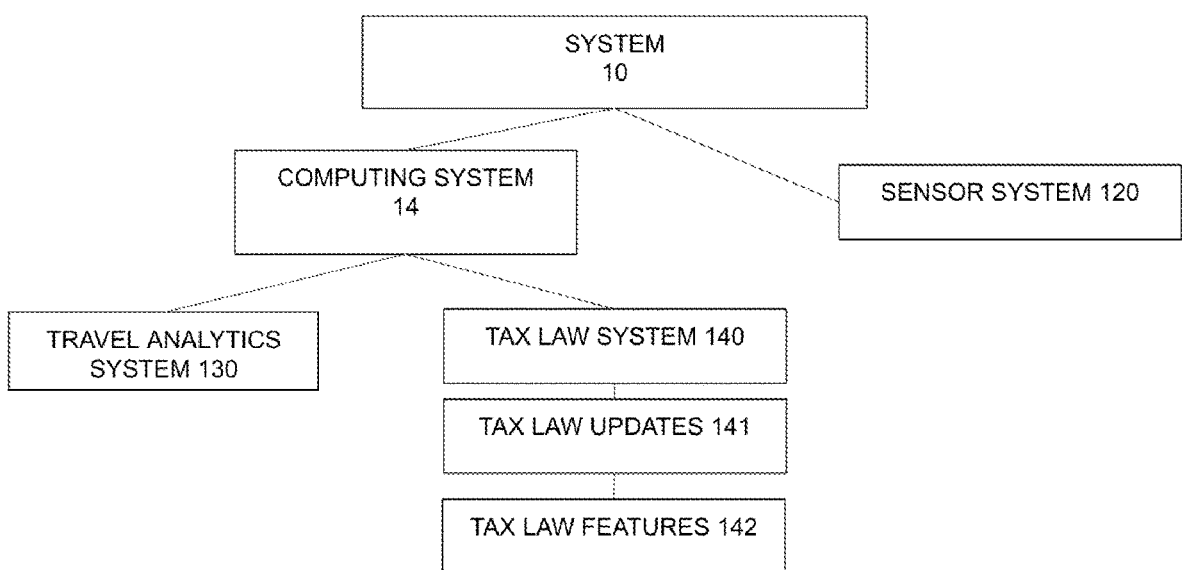
FIG. 19 is a diagram illustrating features of one embodiment of the system; the view showing various systems and additional features of the overall system.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Reference throughout this specification to "one embodiment," "an embodiment," "one example," or "an example" means that a particular feature, structure, or characteristic described in connection with the embodiment or example is included in at least one embodiment of the present disclosure. Thus, the appearance of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium.

Any combination of one or more computer-usable or computer-readable media may be utilized. For example, a computer-readable medium may include one or more of a portable computer removable drive, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code, or virtual code, or framework code suitable for the disclosure herein, or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("Saas"), Platform as a Service ("PaaS"), and Infrastructure as a Service ("IaaS")), and deployment models (e.g., private cloud, community cloud, public cloud, and hybrid cloud).

The flowchart and block diagrams in the attached figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

System:

With reference to the figures, an identification system, a geographic location verification system, a system for verifying an identification in a geographic location, processes of authenticating, and methods of use 10 are presented. Identification system, a geographic location verification system, a system for verifying an identification in a geographic location, processes of authenticating, and methods of use 10 (hereafter referred to as "identification system", "geographic tracking system", "authenticated user geographic tracking system", "tax residency tracking system", or simply "system") is formed of any suitable size, shape and design.

In the arrangement shown, as one example, system 10 is configured to utilize biometric authentication to verify the physical presence and/or physical location of a user. This information is paired and validated with the geographic location of the user through a smart device and/or location device. The information is then integrated and recorded with a timestamp so that time spent in various locations and jurisdictions can be accurately tracked and recorded. This information can then be used for various purposes such as tax residency purposes, visa tracking, travel tracking, goal setting, and the like. Furthermore, in another example, system 10 is configured to be utilized by a first party (such as an employer) verifying the location of a second party (such as an employee). This may also be the case of a family verifying the location of other family members, and the like. Furthermore, system 10 can generate reports which can be provided to governments, tax professionals, entities, friends, and the like.

In the arrangement shown, as one example, system 10 is configured to process a user's biometric information. In the arrangement shown, as one example, a fingerprint or fingerprints are used for biometric information. However, this verification method is only one example, as used herein, for explanation. Other authentication types are hereby contemplated for use. Other types of biometric authentication include, but are not limited to, retinal scanning, dna scanning, verification through third party services which provide identity verification services, password verification, photo upload and verification, video chatting and viewing verification, a combination thereof, and the like.

In the arrangement shown, global positioning satellite (GPS) systems are used for geographic location verification. These systems are used herein as an example, and include the GPS systems available on most smartphones. However, other geographic location systems are also hereby contemplated for use. Other systems include, but are not limited to M-GPS systems, wireless internet location verification, triangulation through wireless internet router systems, triangulation through cell tower routing, a combination thereof, and the like.

In the arrangement shown, and said another way, system 10 is configured to interact with a smart device or mobile smart phone and software to provide location verification, this includes but is not limited to latitude and longitude information, but also town, city, state, province, country, region, and other types of location labels which also integrate with google maps, apple maps, and the like for preferred verification and information desires of a user or entity. The system utilizes biometric authentication to verify an individual or group of individuals as desired and their presence in the same location as the device. This information is time stamped and synced before being stored securely.

Furthermore, and in the arrangement shown, the system can autonomously track this information at regular intervals such as when the location of the device changes and/or each time a user accesses the smart device using biometric authentication. Furthermore, other desires might be to provide notifications to a user at regular time intervals or prompts based on geographical location changes, a combination thereof, and the like as may be desired by a user or entity.

In the arrangement shown, as one example, system 10 may comprise remote servers, databases, application servers, application databases, product databases, mobile applications, and/or computers; all of which in continuity or as separate acts fulfill the functions disclosed herein.

System 10 also includes, in the embodiment(s) depicted, a graphical user interface 12, a user 30, a user account 31, a user profile 32, create goals feature 33, a manage goals feature 34, a goals achievement 35, a gamification feature 36, and a personal travel log 37. Said another way, system 10 is configured with a goal setting, goal tracking, and goal notification feature. For example, a user may desire to be in a certain location for a particular amount of time to achieve a financial benefit. By one example, and only for ease of explanation, a user may desire to be in the state of Florida for 183 days. This will incur a benefit of no state income tax. System 10 is configured to allow for this goal entry and/or prompt this goal entry based on pre-loaded and/or updated tax laws. System 10 will then provide updates to a user based on how many days the user has spent in a particular location, such as Florida, for the time frame desired-a calendar year. System 10 can then also provide updates on how many days are left and how many days a user must be in Florida remaining. Furthermore, system 10 can provide how many days a user can spend outside of Florida to still achieve this goal.

Furthermore, and in the arrangement shown as one example, system 10 also includes, in the embodiments depicted, a geographic location 38 of a personal travel log 37, a timestamp of a travel log 39 having a recording device which records time and location, a passive collection feature 40, an active collection feature 41, a tax residency 42, a visa 44, a visa tracking feature 46, visa submission feature 47, a geographic location 48 of a user, a timestamp 49 of a user, a smart device 50, a global positioning system 51 of a smart device, a geographic location 52 of a smart device 50, a longitude of location 53, a latitude of location 54, a timestamp of location 55, an alternative geographic location tracking system 56, a wifi location 57, an internet protocol (IP) address identification 58, a triangulation system 59, among other components, features, and functionality.

Additionally, and in the arrangement shown, as one example, system 10 includes a user biometric system 60 or user biometric authentication system, a facial recognition system 61, a fingerprint system 62, a retina scanning system 63, a dna scanning system 64, a third party identification system 65, a third party saved password identifier 66, a photo capture system with upload feature 67, a photo upload system, a photo upload request, and a video chat verification feature 68, among other identification features and processes.

Furthermore, and in the arrangement shown, as one example, system 10 includes a timeline history 70, a historical data feature 72, a historical tracking feature, an event history feature 74, a verified event history feature 76, a personal travel analytics feature 80 as part of the travel analytics system 130, a travel view feature 82, among other tracking, viewing, and reporting features.

Additionally, and in the arrangement shown as one example, system includes a reports creation feature 90, a reports feature 92, a report generator 94, a verified submission feature 96, a search reports feature 97, a download reports feature 98, and a save reports feature 99, among other reporting and submission features, including jurisdictional formatting and incorporation of various jurisdictional laws and regulations requirements.

Furthermore, and in the arrangement shown, as one example, system 10 includes a summary page 100, a chronostats feature 101, a chronological view feature 102, a countries visited feature 104, a cities visited feature 106, a U.S. states visited feature 108, a global traveler feature 110, a country highlight maps feature 112, a global traveler feature 114, chart creation features including bar chart creation 116, other tracking features for recording number of countries visited and the like.

Additionally, and in the arrangement shown as one example, system 10 includes updates and law feature, along with a variety of information displays, a status feature, a gamification status of time traveled feature, a rankings board, a tax law system 140 including various tax law features, a tax law update feature 141, a tax law accordance feature 142, a visa law feature, a visa law updates feature, a travel analytics system, a computing system, a communication and/or control system, an application server, and a mobile computing application, a plurality of sensors or sensor system for detecting environmental and user information, an onboard computing system, and communication and control components, among other components, features, and functionality.

Graphical User Interface:

In the arrangement shown, as one example, system 10 may include a graphical user interface. Graphical user interface is formed of any suitable size shape and design and is configured to allow a user to view interact with, manipulate, and visually access system data and information, information related thereto, and/or view various data for various geographic locations, history of geographic locations and/or add information to system (in some instances; where information is accessible and/or unlocked to user) and/or biometric authentication and/or change the settings of the settings, and the like.

Graphical user interface is an exemplary method by which systems of the present disclosure may operate and/or make programming changes to the operation of system 10. Employing graphical user interface, enhances a user's interactions with system 10 in the form of awareness and knowledge of data within the system 10. System 10 provides direct links to a user's history, settings, programming, and other information related to a particular function and/or a particular component and/or a particular user and/or a particular operation. In this way graphical user interface provides for a means for a user to make adjustments to the operation and functionality of system 10.

Computing Platform:

In the arrangement shown, as one example, system 10 includes a computing platform 14 (or "computer", or "computer platform"). Computing platform 14 is formed of any suitable size, shape, and design and is configured to provide computing support, power, and computing processing for both onboard computing functionality as well as communication for off-board or server computing functionality. In this way, an onboard computing system 16, among other components and features on top of the platform.

In the arrangement shown, as one example, system 10 includes a computer. Computer, may be a smart phone tracking geographic location and the like, and is formed of any suitable size, shape, and design and is configured to provide for the main off-board computing processing and implementation of computer handling of data from data gathering performed.

Remote Computing System:

In one arrangement, as is shown, system 10 includes a remote computing system 18 (or "remote computing device"). Remote computing device 18 is formed of any suitable size, shape, and design and configured to handle onboard computing operations, as are necessary for the operation of system 10. Remote computing device is connected with electronic network and/or database and/or server or cloud via communication means and includes a processor, a memory, a microcontroller, a printed circuit board, a microprocessor, a receiver/transceiver, may include at least one antenna, a power supply, and a communications system, among other components.

Sensor System:

In the arrangement shown, as one example, system 10 includes a sensor system 120. Sensor system 120 is formed of any suitable size, shape, and design and may include one or more sensors and/or one or more sensing technologies. In the arrangement shown, as one example, sensor system is configured to detect and communicate information related to system 10 as well as the geographic location of the device and the like.

Application Server:

In the arrangement shown, as one example, system 10 may comprise remote servers, databases, and/or computers that fulfill the functions disclosed and described herein. In the embodiment depicted, system 10 comprises an application server 20. Application server 20 comprises one or more computer systems adapted to transmit and receive data regarding selected datasets related to various users and/or datasets related to multiple users. Application server is adapted to query databases, and may utilize unique identification codes, to retrieve information and associated information related to system 10.

In addition to the above identified features, options, controls, and components, system 10 may also include other features and functionalities, among other options, controls, and components.

It will be appreciated by those skilled in the art that other various modifications could be made to the system, process, and method of use without parting from the spirit and scope of this disclosure. All such modifications and changes fall within the scope of the claims and are intended to be covered thereby.

What is claimed:

1. A geographic location and time tracking system, comprising:

a location tracking system;

the location tracking system having a longitude tracking feature;

the location tracking system having a latitude tracking feature;

a smart device;

the smart device having a geographic location;

a timestamp of the geographic location of the smart device;

wherein the timestamp assigns a time to each geographic location recorded;

a geographic location recording device;

wherein the geographic location recording device records each geographic location with timestamps;

wherein the location tracking system identifies with a predetermined accuracy of precision the geographic location of the smart device;

a biometric authentication;

a biometric identification;

a geographic location of the biometric identification;

a timestamp of the geographic location of the biometric identification;

wherein the biometric authentication of the biometric identification by the smart device verifies the geographic location of the biometric identification is the same as the geographic location of the smart device;

wherein the system verifies the geographic location of the smart device in connection with the biometric identification; wherein when the geographic location of the smart device is verified simultaneously with the biometric identification, the timestamp is created and assigned both the timestamp and the geographic location;

wherein a list of verified events and a list of unverified events is created which are associated with the timestamps recorded at the geographic locations recorded.

2. The system of claim 1, further comprising:

wherein the smart device is a smart phone;

wherein the location tracking system is a global positioning system.

3. The system of claim 1, further comprising:

wherein the location tracking system is selected from a group consisting of: a global positioning system, a wifi location, an internet protocol address identification, a mobile triangulation feature, and a facial recognition feature.

4. The system of claim 1, further comprising:

wherein the biometric authentication is selected from a list consisting of: a third party identification login, a photo upload request, and a verification by video chat;

wherein the verified events and unverified events are authenticated and recorded; wherein recording the verified events and the unverified events is logging the verified and unverified events in a verified event history log; wherein the verified event history log is a tamper-resistant ledger available for compliance submissions.

5. The system of claim 1, further comprising:

wherein the biometric authentication is a facial recognition feature;

the biometric authentication having a module comprising a facial recognition camera.

6. The system of claim 1, further comprising:

wherein the biometric authentication is a fingerprint scan;

the biometric authentication having a module comprising a fingerprint sensor.

7. The system of claim 1, further comprising:

wherein the biometric authentication is a retina scan;

the biometric authentication having a module comprising a retina scanner.

8. The system of claim 1, further comprising:

a passive collection feature of the geographic location.

9. The system of claim 1, further comprising:

an active collection feature of the geographic location;

the active collection feature prompting the biometric identification at intervals to provide biometric authentication;

wherein the verified events and unverified events are authenticated and recorded; wherein recording the verified events and the unverified events is logging the verified and unverified events in a verified event history log; wherein the verified event history log is a tamper-resistant ledger available for compliance submissions;

a reporting feature;

a submission feature;

wherein the submission feature provides for submitting the verified event history log for compliance submissions; wherein the submission feature generates a report of the verified event history log.

10. The system of claim 1, further comprising:

a graphical user interface;

the graphical user interface having a create goals feature;

the graphical user interface having a manage goals feature;

the graphical user interface having a goal achievement feature;

the graphical user interface having a gamification badge feature;

the graphical user interface having a timelines feature;

the graphical user interface having a historical data tracking feature;

the graphical user interface having a verified event history;

the graphical user interface having a personal travel analytics feature;

the graphical user interface having a travel view feature;

a computing platform;

the computing platform having an onboard computing system;

the computing platform having an application server;

the computing platform having a processor;

the computing platform having a memory;

the computing platform having a communication feature;

wherein the communication feature sends and receives information.

11. The system of claim 1, further comprising:

a tax residency;

a tax residency tracking feature;

wherein the system verifies the geographic location of the smart device in connection with the biometric identification; wherein when the geographic location of the smart device is verified simultaneously with the biometric identification, the timestamp is created and assigned both the timestamp and the geographic location;

wherein a list of verified events and a list of unverified events is created which are associated with the timestamps recorded at the geographic locations recorded;

a tax residency submission feature;

wherein the verified events and unverified events are authenticated and recorded; wherein recording the verified events and the unverified events is logging the verified and unverified events in a verified event history log; wherein the verified event history log is submitted for purposes of tax residency tracking requirements through the tax residency submission feature.

12. A biometrically authenticated geographic location and time tracking system, comprising:

a location tracking system;

the location tracking system having a longitude tracking feature;

the location tracking system having a latitude tracking feature;

wherein the location tracking system determines a location identification based on the longitude tracking feature and the latitude tracking feature;

a smart device;

the smart device having a geographic location;

a timestamp of the geographic location of the smart device;

wherein the timestamp assigns a time to each geographic location recorded;

a geographic location recording device;

a biometric authentication;

a biometric identification;

a geographic location of the biometric identification;

a timestamp of the geographic location of the biometric identification;

wherein the biometric authentication verifies the geographic location of the biometric identification is the same as the geographic location of the smart device;

wherein the location tracking system identifies with a predetermined accuracy of precision the geographic location of a smart device;

a computing platform;

a graphical user interface;

a global positioning system;

wherein the system verifies the geographic location of the smart device in connection with the biometric identification; wherein when the geographic location of the smart device is verified simultaneously with the biometric identification, the timestamp is created and assigned both the timestamp and the geographic location;

wherein a list of verified events and a list of unverified events is created which are associated with the timestamps recorded at the geographic locations recorded.

13. The system of claim 12, further comprising:

a visa;

a visa tracking feature;

wherein the system verifies the geographic location of the smart device in connection with the biometric identification; wherein when the geographic location of the smart device is verified simultaneously with the biometric identification, the timestamp is created and assigned both the timestamp and the geographic location;

wherein a list of verified events and a list of unverified events is created which are associated with the timestamps recorded at the geographic locations recorded;

a visa submission feature;

wherein the verified events and unverified events are authenticated and recorded; wherein recording the verified events and the unverified events is logging the verified and unverified events in a verified event history log; wherein the verified event history log is submitted for purposes of visa requirements through the visa submission feature.

14. The system of claim 12, further comprising:

a passive collection feature;

wherein the biometric identification authenticates upon changing location.

15. The system of claim 12, further comprising:

a travel analytics system;

wherein the travel analytics system provides a duration of time spent in each location;

wherein the travel analytics system provides analytics related to the location of the biometric identification.

16. The system of claim 12, further comprising:

a report creation feature;

a report generator;

wherein the report generator generates a data record only when: (i) the biometric authentication is authenticated using the biometric identification, and (ii) the geographic location is obtained within an authentication threshold;

wherein the report generator generates a report of physically co-located smart device and biometric biometric identification confirmations;

a plurality of reports;

a verified submission feature;

a search reports feature;

a save reports feature;

a submit reports feature;

the submit reports feature having a plurality of formatting features for various jurisdictions.

17. The system of claim 12, further comprising:

a travel analytics system;

wherein the system provides a duration of time spent in each location;

wherein the system provides analytics related to the location of the biometric identification;

a summary page;

a chronological view feature;

a countries visited feature;

a cities visited feature;

a states visited feature;

a global traveler feature;

a country highlights map feature;

a charting feature;

wherein the biometric identification, in combination with the smart device, verify identify and geographic location at regular intervals to create a time spent in jurisdiction;

wherein the time spent in jurisdiction can be used to calculate a percentage of each calendar year of time spent in each of the jurisdictions by the biometric identification.

18. The system of claim 12, further comprising:

a tax system;

a tax residency;

wherein the biometric identification has a plurality of tax residencies;

wherein the tax system generates the tax residency for the biometric identification;

wherein the tax system provides reporting of the tax residency for the biometric identification.

19. The system of claim 12, further comprising:

an active collection feature;

the active collection feature prompting the biometric identification at intervals to provide biometric authentication;

an employer verification;

an employer verification tracking feature;

wherein the system verifies the geographic location of the smart device in connection with the biometric identification; wherein when the geographic location of the smart device is verified simultaneously with the biometric identification, the timestamp is created and assigned both the timestamp and the geographic location;

wherein a list of verified events and a list of unverified events is created which are associated with the timestamps recorded at the geographic locations recorded;

an employer verification submission feature;

wherein the verified events and unverified events are authenticated and recorded; wherein recording the verified events and the unverified events is logging the verified and unverified events in a verified event history log; wherein the verified event history log is submitted for purposes of employer verification tracking requirements through the employer verification submission feature.

\* \* \* \* \*